United States Patent
Amadou et al.

(10) Patent No.: US 12,412,282 B2
(45) Date of Patent: Sep. 9, 2025

(54) SEMI-SUPERVISED TRACKING IN MEDICAL IMAGES WITH CYCLE TRACKING

(71) Applicant: SIEMENS HEALTHINEERS AG, Forchheim (DE)

(72) Inventors: Abdoul Aziz Amadou, London (GB); Rui Liao, Princeton Junction, NJ (US); Yue Zhang, Jersey City, NJ (US)

(73) Assignee: Siemens Healthineers AG, Forchheim (DE)

( * ) Notice: Subject to any disclaimer, the term of this patent is extended or adjusted under 35 U.S.C. 154(b) by 723 days.

(21) Appl. No.: 17/657,366

(22) Filed: Mar. 31, 2022

(65) Prior Publication Data

US 2023/0316544 A1    Oct. 5, 2023

(51) Int. Cl.
*G06T 7/246* (2017.01)
*G06T 7/73* (2017.01)

(52) U.S. Cl.
CPC ............. *G06T 7/248* (2017.01); *G06T 7/74* (2017.01); *G06T 2207/10016* (2013.01); *G06T 2207/20081* (2013.01); *G06T 2207/20084* (2013.01); *G06T 2207/30004* (2013.01)

(58) Field of Classification Search
CPC ........ G06T 7/248; G06T 7/74; G06T 2207/10016; G06T 2207/20081; G06T 2207/20084; G06T 2207/30004
See application file for complete search history.

(56) References Cited

U.S. PATENT DOCUMENTS

| | | | |
|---|---|---|---|
| 10,713,794 B1 * | 7/2020 | He | G06N 3/084 |
| 2018/0253837 A1 * | 9/2018 | Ghesu | G06T 7/0012 |
| 2019/0310648 A1 * | 10/2019 | Yang | G06N 20/20 |
| 2020/0184654 A1 * | 6/2020 | Kim | G06V 10/98 |

(Continued)

OTHER PUBLICATIONS

Andreucci et al., "Side Effects of Radiographic Contrast Media: Pathogenesis, Risk Factors, and Prevention", BioMed Research International, vol. 2014, Article ID 741018, 2014, pp. 1-20.

(Continued)

*Primary Examiner* — Pinalben Patel

(57) ABSTRACT

Systems and methods for tracking a location of an object of interest through a sequence of medical images are provided. First and second input medical images of a patient are received. The first input medical image comprises an annotation of a location of an object of interest. Features are extracted from the first and the second input medical images. A location of the object of interest in the second input medical image is determined using a machine learning based location predictor network based on the annotation of the location of the object of interest in the first input medical image and the extracted features from the first and the second input medical images. The location of the object of interest in the second input medical image is output. The machine learning based location predictor network is trained based on a comparison between 1) locations of a particular object in a sequence of training images determined during a forward tracking of the particular object through the sequence of training images and 2) locations of the particular object determined during a backward tracking of the particular object through the sequence of training images.

16 Claims, 7 Drawing Sheets

(56) References Cited

U.S. PATENT DOCUMENTS

2021/0174518 A1* 6/2021 Ishikake ............... G06T 7/246
2021/0366120 A1* 11/2021 Ito ...................... G06V 10/40

OTHER PUBLICATIONS

Kristan et al., "The Eighth Visual Object Tracking VOT2020 Challenge Results." ECCV Workshops, 2020, pp. 547-601.
Wang et al., "Learning Correspondence From the Cycle-Consistency of Time", 2019 IEEE/CVF Conference on Computer Vision and Pattern Recognition (CVPR), 2019, pp. 2566-2576.
Ambrosini et al., "Fully automatic and real-time catheter segmentation in X-ray fluoroscopy", Medical Image Computing and Computer-Assisted Intervention, 2017, pp. 577-585.
Piayda et al., "Dynamic coronary roadmapping during percutaneous coronary intervention: a feasibility study", European Journal of Medical Research, vol. 23, 2018, pp. 1-7.
Zhang et al., "Cascade attention machine for occluded landmark detection in 2D X-Ray angiography", IEEE WACV 2019, pp. 91-100.
Ma et al., "Dynamic coronary roadmapping via catheter tip tracking in X-ray fluoroscopy with deep learning-based Bayesian filtering", Medical Image Analysis 61, 2020, 101634, pp. 1-29.
Ullah et al., "Synthesize and Segment: Towards Improved Catheter Segmentation via Adversarial Augmentation", Applied Sciences, 2021, pp. 1-16.
Li et al., "SiamRPN++: Evolution of Siamese Visual Tracking With Very Deep Networks", IEEE/CVF Conference on Computer Vision and Pattern Recognition, 2019, pp. 4277-4286.

\* cited by examiner

SEMI-SUPERVISED TRACKING IN MEDICAL IMAGES WITH CYCLE TRACKING

TECHNICAL FIELD

The present invention relates generally to tracking in medical images, and in particular to semi-supervised tracking in medical images with cycle tracking.

BACKGROUND

The tracking of objects of interest in medical images is an important task for many different clinical applications. One important clinical application of tracking objects of interest in medical images is visual guidance during interventional procedures. As an example, in the case of x-ray imaging, a contrast agent is administered to a patient for navigating in the patient. However, contrast agents can be harmful to the patient, cause longer procedure times, and cause prolonged exposure to radiation for both patients and clinicians. Further, the contrast agent may occlude portions of the x-ray images. While various methods have been proposed to address this occlusion, such methods present several constraints on their usage in clinical settings. For example, such methods may only work on images where no contrast agents are used or where human intervention is required for images acquired using contrast agents, may require assumptions on the shape of the devices tracked which may not be valid, or may have sub-optimal accuracy for clinical applications Recently, deep learning based approaches for tracking objects of interest in images have been proposed. Such deep learning based approaches are trained on extensively annotated datasets of natural images. However, the application of such deep learning based approaches to medical images is challenging due to the difficulty, the time, and the expense in annotating medical images and due to the performance requirements in medical applications.

BRIEF SUMMARY OF THE INVENTION

In accordance with one or more embodiments, systems and methods for tracking a location of an object of interest through a sequence of medical images are provided. First and second input medical images of a patient are received. The first input medical image comprises an annotation of a location of an object of interest. Features are extracted from the first and the second input medical images. A location of the object of interest in the second input medical image is determined using a machine learning based location predictor network based on the annotation of the location of the object of interest in the first input medical image and the extracted features from the first and the second input medical images. The location of the object of interest in the second input medical image is the output of the predictor network. The machine learning based location predictor network is trained based on a comparison between 1) locations of a particular object in a sequence of training images determined during a forward tracking of the particular object through the sequence of training images and 2) locations of the particular object determined during a backward tracking of the particular object through the sequence of training images.

In one embodiment, the machine learning based location predictor network determines the locations of the particular object from a first image to a last image of the sequence of training images during the forward tracking and the machine learning based location predictor network determines the locations of the particular object from the last image to the first image in the sequence of training images during the backward tracking. A first image and a last image in the sequence of training images may be annotated with a ground truth location of the particular object. The location of the object of interest in the first input medical image may be manually annotated by a user or automatically annotated using a machine learning based network In one embodiment, the machine learning based location predictor network may be further trained based on a comparison between locations of the particular object in annotated training images of the sequence of training images and annotated ground truth locations of the particular object in the annotated training images. In another embodiment, the machine learning based location predictor network may be further trained based on a comparison between a location of the particular object in a first training image of the sequence of training images and an annotated ground truth location of the particular object in the first training image of the sequence of training images.

In one embodiment, the location of the object of interest in the second input medical image may be determined by correlating the features extracted from the first input medical image with the features extracted from the second input medical image and determining the location of the object of interest in the second input medical image based on the correlated features. The features may be correlated by matching features extracted from the first input medical image for regions corresponding to the location of the object of interest with features extracted from the second input medical image.

In one embodiment, the receiving, the extracting, the determining, and the outputting are repeated using the second input medical image as the first input medical image and a next image of the sequence of medical images as the second input medical image.

These and other advantages of the invention will be apparent to those of ordinary skill in the art by reference to the following detailed description and the accompanying drawings.

DETAILED DESCRIPTION

The present invention generally relates to methods and systems for semi-supervised tracking in medical images with cycle tracking. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for the semi-supervised tracking of objects of interest through a sequence of input medical images using a machine learning based location predictor network. The location predictor network is trained, at least in part, with trajectory consistency. In trajectory consistency, the location predictor network is trained to first track a location of an object of interest forward through a sequence of training images and then backward through the sequence of training images. The location predictor network is trained with a trajectory consistency loss that compares locations of the object of interest determined in the forward tracking with locations of the object of interest determined in the backward tracking. Advantageously, the location predictor network is trained with trajectory consistency by comparing predicted locations with each other, and does not require ground truth locations of the object of interest annotated in each of the images in the sequence of training images.

Figure 1:
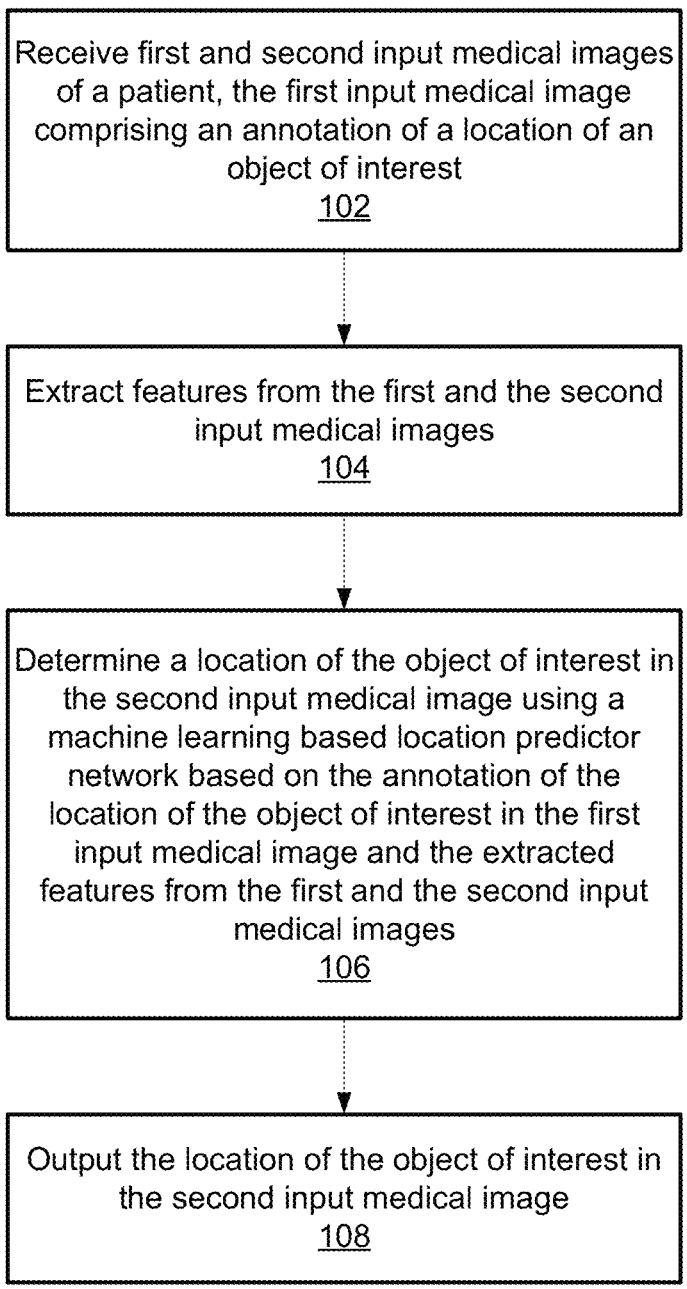
FIG. 1 shows a method for tracking a location of an object of interest through in a sequence of input medical images, in accordance with one or more embodiments.
Figure 2:
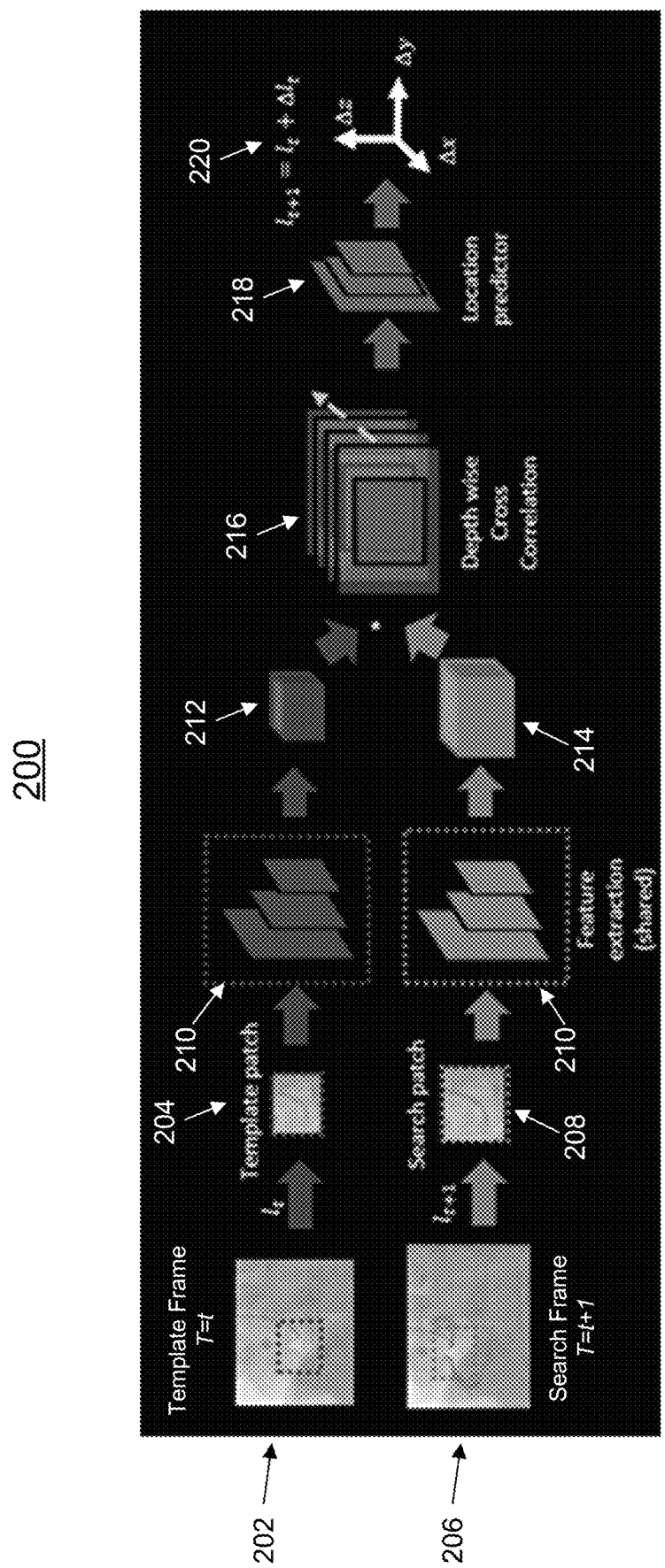
FIG. 2 shows a workflow for tracking a location of an object of interest through in a sequence of input medical images, in accordance with one or more embodiments.

FIG. 1 shows a method 100 for tracking a location of an object of interest through in a sequence of input medical images, in accordance with one or more embodiments. The steps of method 100 may be performed by one or more suitable computing devices, such as, e.g., computer 702 of FIG. 7. FIG. 2 shows a workflow 200 for tracking a location of an object of interest through in a sequence of input medical images, in accordance with one or more embodiments. FIG. 1 and FIG. 2 will be described together.

At step 102 of FIG. 1, first and second input medical images of a patient are received. The first input medical image comprises an annotation of a location of an object of interest. The object of interest may be any suitable object of interest, such as, e.g., a medical instrument (e.g., catheter), an anatomical landmark, a lesion, etc. The location of the object of interest may be manually annotated in the first input medical image by a user (e.g., a clinical) or may be automatically annotated, e.g., by an upstream system in the clinical workflow. For example, the location of the object of interest in the first input medical image may be automatically annotated by a machine learning based network determining a location of the object of interest in the first input medical image. In one embodiment, the location of the object of interest in the first input medical image may be determined during a prior iteration of method 100 of FIG. 1.

In one embodiment, the first and second input medical images are patches extracted from medical images. For example, as shown in workflow 200 of FIG. 2, the first input medical image may be template patch $l_t$ 204 extracted (e.g., cropped) from template image or frame 202 and the second input medical image may be search patch $l_{t+1}$ 208 extracted from search image or frame 206. Template patch $l_t$ 204 may be extracted from template frame 202 centered around the location of the object of interest in the image 202. Search patch $l_{t+1}$ 208 may be extracted from search frame 206 centered around a location in search frame 206 corresponding to the location of the object of interest in template frame 202. Template patch $l_t$ 204 and search patch $l_{t+1}$ 208 may be of any suitable predetermined size. In one embodiment, search patch $l_{t+1}$ 208 is of a size larger than template patch $l_t$ 204 to prevent situations where the object of interest moves outside of the cropped area due to a large motion. Template frame 202 is denoted as the "template" frame as template frame 202 comprises the annotation of the location of the object of interest while search frame 206 is denoted as the "search" frame as the location of the object of interest is to be determined in search frame 202 to thereby track the location of the object of interest from template frame 202 to search frame 206. Advantageously, by extracting patches 204 and 208, the input size of the input medical images is reduced to thereby enable near real-time performance. In another embodiment, the first and second input medical images are template frame 202 and search frame 206 respectively.

In one embodiment, the first and second input medical images are consecutive images or frames of a sequence of input medical images. For example, as shown in workflow 200 of FIG. 2, template patch 204 is extracted from template frame 202 acquired at a time T=t and search patch 208 is extracted from search from 206 acquired at a next time T=t+1.

The first and second input medical images may be of any suitable modality, such as, e.g., CT (computed tomography), MRI (magnetic resonance imaging), ultrasound, x-ray, or any other medical imaging modality or combinations of medical imaging modalities. The first input medical image and/or the second input medical image may be 2D (two dimensional) images and/or 3D (three dimensional) volumes. The first input medical image and/or the second input medical image may be received directly from an image acquisition device, such as, e.g., a CT scanner, as the medical images are acquired, or can be received by loading previously acquired medical images from a storage or memory of a computer system or receiving medical images that have been transmitted from a remote computer system.

At step 104 of FIG. 1, features are extracted from the first and the second input medical images. The features may be extracted from the first and the second input medical images using any suitable approach. In one embodiment, the features may be extracted from the first and the second input medical images using a machine learning based feature extractor network, such as, e.g., a fully convolutional neural network. For example, as shown in workflow 200 of FIG. 2, features 212 and features 214 are respectively extracted from template patch 204 and search patch 208 using feature extraction network 210. While feature extraction network 210 is separately shown in workflow 200, it should be understood that feature extraction network 210 for extracting features from template patch 204 and search patch 208 is the same feature extraction network. The features are low-level latent features representing the most important features from template patch 204 and search patch 208. In one embodiment, the features may be represented in multiple channels each representing aspects of the images (e.g., shape, color, etc.).

At step 106 of FIG. 1, a location of the object of interest in the second input medical image is determined using a machine learning based location predictor network based on the annotation of the location of the object of interest in the first input medical image and the extracted features from the first and the second input medical images.

In one embodiment, the location of the object of interest in the second input medical image is determined by first correlating the features extracted from the first input medical image with the features extracted from the second input medical image. The correlation may be performed using any suitable machine learning based correlation network. For example, as shown in workflow 200 of FIG. 2, features 212 and 214 are correlated by depth wise cross correlation layer 216. Depth wise cross correlation layer 216 matches features extracted from the first input medical image for regions corresponding to the location of the object of interest with features with features extracted from the second input medical image. For example, depth wise cross correlation layer 216 may compare a first channel of features extracted from template patch 204 with a corresponding first channel of features extracted from search patch 208, a second channel of features extracted from template patch 204 with a corresponding second channel of features extracted from search patch 208, etc. In this manner, the correlation of the features is performed in a three dimensionally across each channel of the features.

The location predictor network then determines a location of the object of interest in the second input medical image based on the correlated features. The location of the object of interest in the second input medical image may be determined by any suitable machine learning based location predictor network, such as, e.g., a fully convolutional neural network. For example, as shown in workflow 200 of FIG. 2, location 220 of the object of interest in template frame 202 is determined based on the correlated features by location predictor network 218.

The location predictor network is trained during a prior offline or training stage using one or more sequences of training images. During training, the location predictor network tracks the location of a particular object by performing a pairwise analysis of pairs of images in the sequence of training images during a forward tracking and a backward tracking. In the forward tracking, the location predictor network tracks the location from a first image in the sequence of training images to a last image in the sequence of training images. In the backward tracking, the location predictor network tracks the location from the last image in the sequence of training images to the first image in the sequence of training images. While the first and the last images in the sequence of training images are annotated with the location of the particular object, the training images therebetween are not necessarily annotated. In one embodiment, the location predictor network is trained, at least in part, with a trajectory consistency loss based on a comparison between 1) locations of the particular object in the sequence of training images determined during the forward tracking of the particular object through the sequence of training images and 2) locations of the particular object determined during the backward tracking of the particular object through the sequence of training images. The location predictor network may additionally be trained based on a keyframe loss and/or a cycle loss. Training of the location predictor network is described in further detail below with respect to FIG. 3. Once trained, the location predictor network is applied during an online or inference stage, for example, to perform step 106 of FIG. 1.

The location of the object of interest in the second input medical image may be represented in any suitable form. In one embodiment, the location of the object of interest in the second input medical image is a location relative to the location of the object of interest in the first input medical image. For example, the location of the object of interest in the second input medical image may be represented as offsets in the x-axis, the y-axis, and/or the z-axis) relative to a coordinate of the location of the object of interest in the first input medical image. In another embodiment, the location of the object of interest in the second input medical image is represented as a coordinate in the second input medical image.

At step 108 of FIG. 1, location of the object of interest in the second input medical image is output. For example, the location of the object of interest in the second input medical image can be output by displaying the location of the object of interest in the second input medical image on a display device of a computer system, storing the location of the object of interest in the second input medical image on a memory or storage of a computer system, or by transmitting the location of the object of interest in the second input medical image to a remote computer system.

In one embodiment, method 100 of FIG. 1 may be iteratively repeated any number of iterations to track the location of the object of interest through the sequence of medical images. For example, method 100 may be iteratively repeated using the second input medical image annotated with the determined location of the object of interest as the first input medical image and the next consecutive image in the sequence of medical images as the second input medical image.

Figure 3:
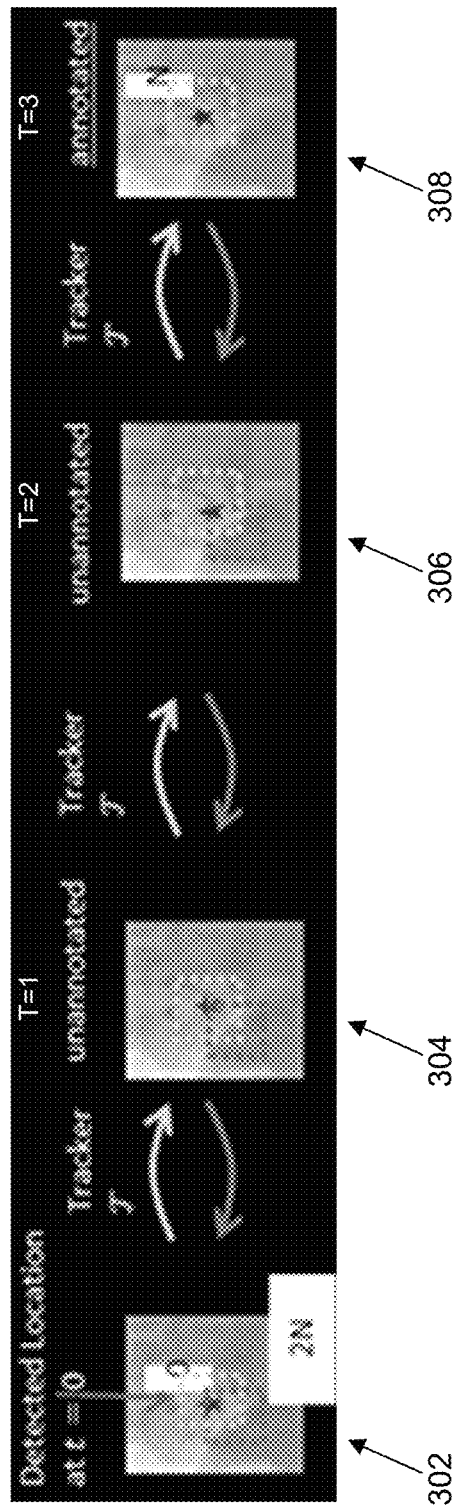
FIG. 3 shows a workflow for training a machine learning based location predictor network for tracking a location of a particular object through a sequence of medical images, in accordance with one or more embodiments.

FIG. 3 shows a workflow 300 for training a machine learning based location predictor network for tracking a location of a particular object through a sequence of medical images, in accordance with one or more embodiments. Workflow 300 is performed during an offline or training stage. In one example, workflow 300 is performed to train the location predictor network applied at step 106 of FIG. 1. t=1

In workflow 300, the location predictor network is trained with a sequence of training images comprising training images 302, 304, 306, and 308 respectively acquired at times t=0, t=1, t=2, and t=3. While the sequence of training images is illustratively shown in FIG. 3 as comprising four training images, the sequence of training images may comprise any suitable number of training images. The first training image 302 and the last training image 308 in the sequence of training images are annotated with the location of the particular object. The location predictor network is applied on pairs of training images in the sequence of training images to track a location of the particular object during a forward tracking and a backward tracking. During the forward tracking, the location predictor network is applied on pairs of training images starting from the first training image 302 to the last training image 308 to track the location of the particular object forward through the sequence of training images. For example, during the forward tracking, the location predictor network is applied to training images 302 and 304 to determine a position of the particular object in training image 304, to training images 304 and 306 to determine a position of the particular object in training image 306, and to training images 306 and 308 to determine a position of the particular object in training image 308. During the backward tracking, the location predictor network is applied on pairs of training images starting from the last training image 308 to the first training image 302 to track the location of the particular object backward through the sequence of training images. For example, during the backward tracking, the location predictor network is applied to training images 308 and 306 to determine a position of the particular object in training image 306, to training images 306 and 304 to determine a position of the particular object in training image 304, and to training images 304 and 302 to determine a position of the particular object in training image 302. The operation of the location predictor network for determining the position of the particular object is similar to that described with respect to FIGS. 1 and 2. The location predictor network is trained using a number of losses based on the forward and backward tracking. In one embodiment, the location predictor network is trained based on a trajectory consistency loss. In other embodiments, the location predictor network may additionally or alternatively be trained based on a keyframe loss and/or a cycle loss.

In trajectory consistency, when the location predictor network tracks the particular object forward and backward through the sequence of training images, the predicted locations of the particular object should follow the same trajectory. According, the location predictor network is trained with a trajectory consistency loss to optimize (e.g., minimize) an error comparing the predicted location of the particular object in a training image i (e.g., training image 304 or 306) during the forward tracking and the predicted location of the particular object in training image i during the backward tracking. Given a sequence of training images of length N, the trajectory consistency loss $L_{ccy}$ may be defined as follows:

$$L_{ccy} = \frac{1}{N-1} \sum_i \left( L^i_{forward} - L^i_{backward} \right)^2 \qquad \text{Equation (1)}$$

where $L_{forward}^i$ denotes the location of the particular object in training image i determined by the location predictor network during the forward tracking and $L_{backward}^i$ denotes the location of the particular object in training image i determined by the location predictor network during the backward tracking.

In the keyframe loss, when the location predictor network tracks the particular object forward and backward through the sequence of training images, for training images annotated with ground truth locations of the particular object, the predicted locations of the particular object should be the same as the annotated ground truth locations of the particular object. Accordingly, the location predictor network is trained with keyframe loss to optimize (e.g., minimize) an error (e.g., a root mean square error) comparing the predicted location of the particular object in an annotated training image i (e.g., training image 302 or 308) during the forward tracking or the backward tracking and the annotated ground truth location of the particular object in the annotated training image i. Given Si annotated images, the keyframe loss $L_{kf}$ may be defined as follows:

$$L_{kf} = \sqrt{\frac{1}{S_i} \sum_{i \in N_i} \left( L^i_{pred} - L^i_{GT} \right)^2} \qquad \text{Equation (2)}$$

where $L_{pred}^i$ denotes the location of the particular object in training image i determined by the location predictor network (during the forward tracking or the backward tracking) and $L_{GT}^i$ denotes the annotated ground truth location of the particular object in training image i.

In cycle consistency, when the location predictor network tracks the particular object forward and backward through the sequence of training images, the predicted location of the particular object tracked forward and backward through the sequence of training images should end where it began. Accordingly, the location predictor network is trained with cycle consistency loss to optimize (e.g., minimize) an error comparing the predicted location of the particular object in the first training image i=0 in the sequence of training images and the annotated ground truth location of the particular object in the first training image i=0. The cycle consistency loss may be defined as follows:

$$L_{cycle} = (L_{pred}^0 - L_{GT}^0)^2 \qquad \text{Equation (3)}$$

where $L_{pred}^0$ denotes the location of the particular object in the first image i=0 in the sequence of training images determined by the location predictor network, with the location $L_{pred}^0$ obtained after forward tracking from the first frame to the last frame, and backward tracking from the location on the last frame back to the first frame, and $L_{GT}^0$ denotes the annotated ground truth location of the particular object in the first training image i=0.

The location predictor network may be trained with trajectory consistency loss, keyframe loss, and cycle consistency loss according to the following final loss function:

$$L_{total} = \omega_1 L_{kf} + \omega_2 L_{cycle} + \omega_3 L_{ccy} \qquad \text{Equation (4)}$$

where $\omega_1$, $\omega_2$, and $\omega_3$ are weights for the keyframe loss, the cycle consistency loss, and the trajectory consistency loss respectively. In one embodiment, the weights are defined as follows: $\omega_1=1$, $\omega_2=0.1$, and $\omega_3=0.1$ such that the keyframe loss is assigned the highest weight. This is because, in the keyframe loss, the predicted locations are compared with annotated ground truth locations.

In one embodiment, the location predictor network is trained with curriculum learning. In curriculum learning, the location predictor network is trained with relatively shorter sequences of training images in the beginning of training. The length of the sequences of training images increases (e.g., linearly) as the training progresses. The reason for this is because starting the training with relatively longer sequences of training images results in unstable training, as the initial values of the keyframe loss will be very high since the location predictor network is not yet efficient as predicting the location of the particular object. Curriculum learning ensures that the location predictor network is first able to manage relatively shorter sequences of training images. By increasing the length of the sequences of training images progressively, the data distribution does not change too quickly and the training can be stabilized.

Figure 4:
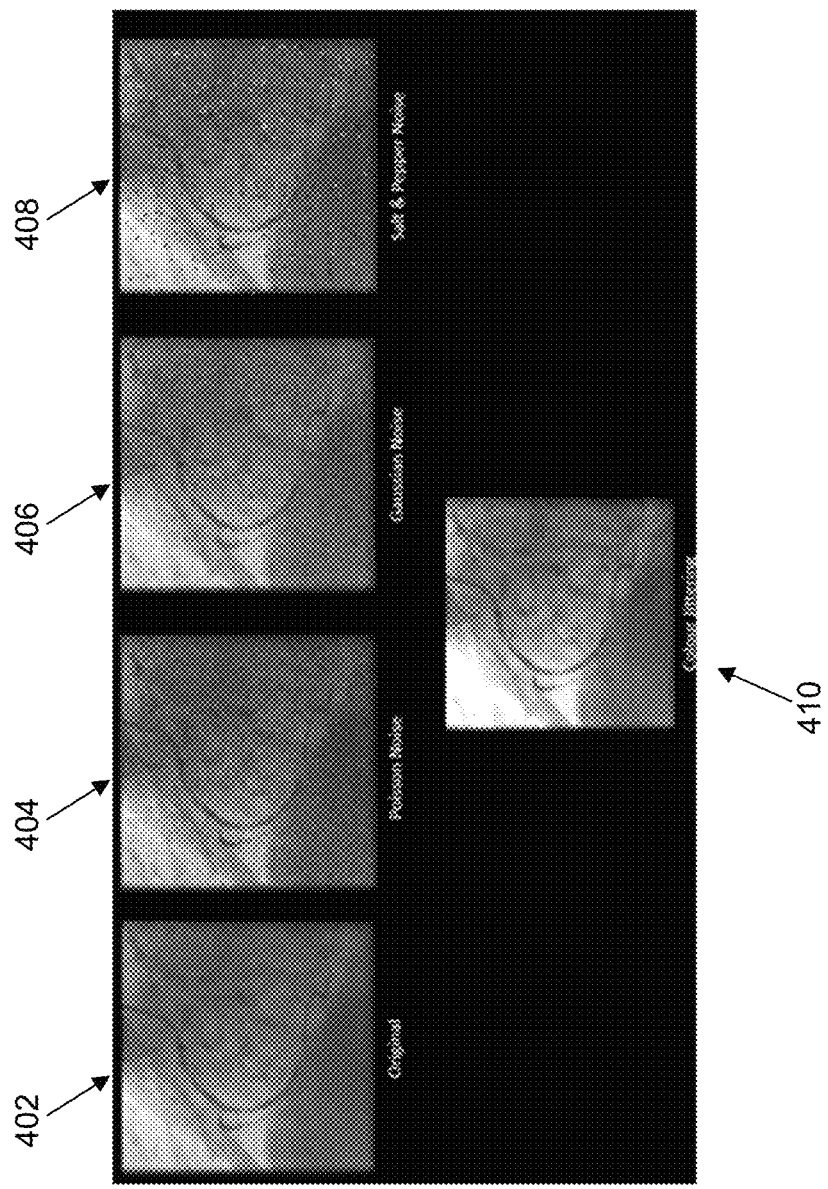
FIG. 4 shows augmented images for training a machine learning based location predictor network, in accordance with one or more embodiments.

In one embodiment, the sequences of training images may be augmented to make feature extraction more robust to noise in images and to various degrees of image quality. FIG. 4 shows augmented images for training a machine learning based location predictor network, in accordance with one or more embodiments. Image 402 is an original image and images 404-410 are augmented images generated from image 402. Augmented image 404 is generated by applying noise following a Poisson distribution to original image 402. Poisson noise is present in x-ray images due to random processes associated with photons when the image is acquired. Augmented image 406 is generated by applying noise following a Gaussian distribution to original image 402. Augmented image 408 is generated by adding salt and pepper noise by randomly assigning an intensity value of 0 (i.e., black) or 1 (i.e., white) to pixels of original image 402. Augmented image 410 is generated by adding color jittering by randomly modifying contrast, brightness, hue, saturation values, and other image parameters of original image 402. While the augmentations described herein target the x-ray domain, any type of augmentation may be applied according to the target application.

Advantageously, embodiments described herein track the locations of an object of interest though a sequence of input medical images while not making assumptions of the object of interest being tracked. The location predictor network does not require extensively annotated training images and may be trained with semi and self-supervised supervision signals. Embodiments described herein were experimentally validated and was found to achieve real-time speed of about 100 frames per second. Embodiments described herein work with x-ray images acquired with and without contrast agents without extra human intervention or extra data.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 5:
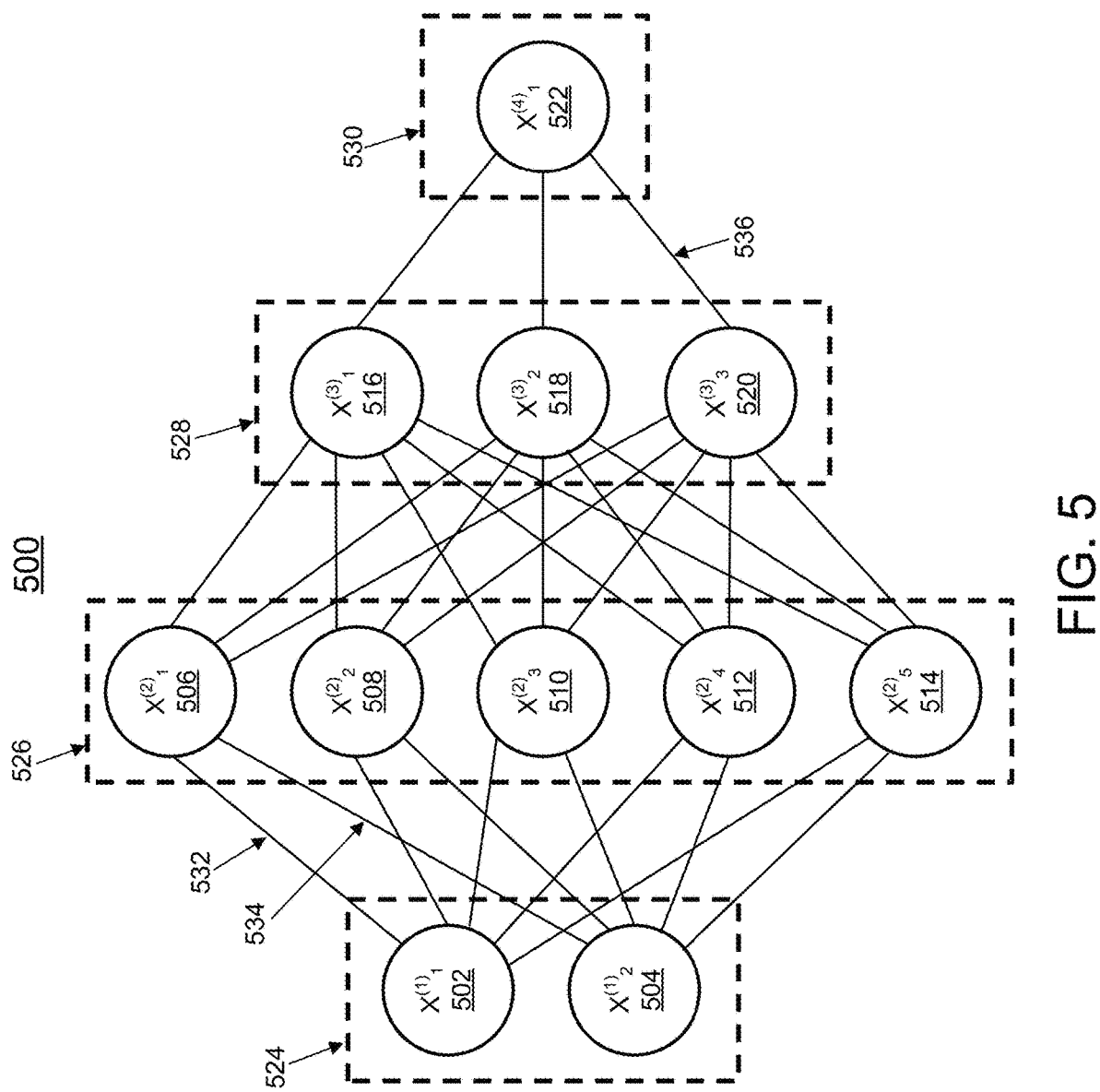
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the machine learning based feature extractor network utilized at step 104, the machine learning based correlation network utilized at step 106, and the machine learning based location predictor network utilized at step 106 of FIG. 1 and feature extraction network 210, depth wise cross correlation layer 216, and location predictor network 218 of FIG. 2, may be implemented using artificial neural network 500.

The artificial neural network 500 comprises nodes 502-522 and edges 532, 534, ..., 536, wherein each edge 532, 534, ..., 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, ..., 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, ..., 536 between the nodes 502-522. In particular, edges 532, 534, ..., 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, ..., 536 can comprise a weight being a real number, in particular, the weight is a real number within the interval [−1, 1] or within the interval [0, 1]. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as $t_i$). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = \left( \sum_k \delta^{(n+1)}_k \cdot w^{(n+1)}_{j,k} \right) \cdot f'\left( \sum_i x^{(n)}_i \cdot w^{(n)}_{i,j} \right)$$

based on $\delta^{(n+1)}_j$, if the (n+1)-th layer is not the output layer, and $$\delta^{(n)}_j = \left( x^{(n+1)}_k - t^{(n+1)}_j \right) \cdot f'\left( \sum_i x^{(n)}_i \cdot w^{(n)}_{i,j} \right)$$

if the (n+1)-th layer is the output layer 530, wherein f' is the first derivative of the activation function, and $y^{(n+1)}_j$ is the comparison training value for the j-th node of the output layer 530.

Figure 6:
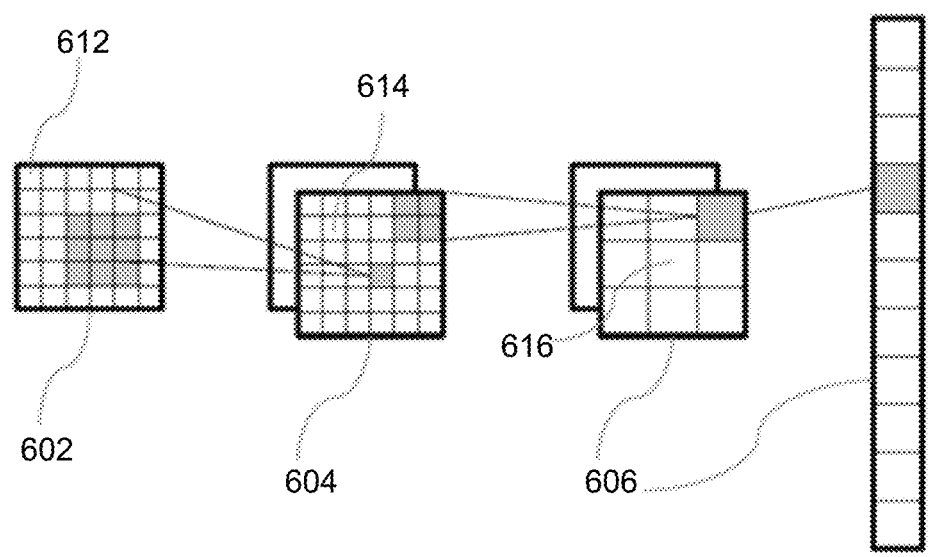
FIG. 6 shows a convolutional neural network that may be used to implement one or more embodiments.

FIG. 6 shows a convolutional neural network 600, in accordance with one or more embodiments. Machine learning networks described herein, such as, e.g., the machine learning based feature extractor network utilized at step 104, the machine learning based correlation network utilized at step 106, and the machine learning based location predictor network utilized at step 106 of FIG. 1 and feature extraction network 210, depth wise cross correlation layer 216, and location predictor network 218 of FIG. 2, may be implemented using convolutional neural network 600.

In the embodiment shown in FIG. 6, the convolutional neural network comprises 600 an input layer 602, a convolutional layer 604, and a pooling layer 606. Alternatively, the convolutional neural network 600 can comprise several convolutional layers 604, and several pooling layers 606, as well as other types of layers. The order of the layers can be chosen arbitrarily.

In particular, within a convolutional neural network 600, the nodes 612-616 of one layer 602-606 can be considered to be arranged as a d-dimensional matrix or as a d-dimensional image. In particular, in the two-dimensional case the value of the node 612-616 indexed with i and j in the n-th layer 602-606 can be denoted as $x^{(n)}_{[i,j]}$. However, the arrangement of the nodes 612-616 of one layer 602-606 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x_{(n-1)}$ of the nodes 612 of the preceding layer 602, where the convolution * is defined in the two-dimensional case as $$x^{(n)}_k[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 612-616 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-616 in the respective layer 602-606. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j] = f(x^{(n-1)}[id_1, jd_2], \ldots, x^{(n-1)}[id_1+d_1-1, id_2+d_2-1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-616, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
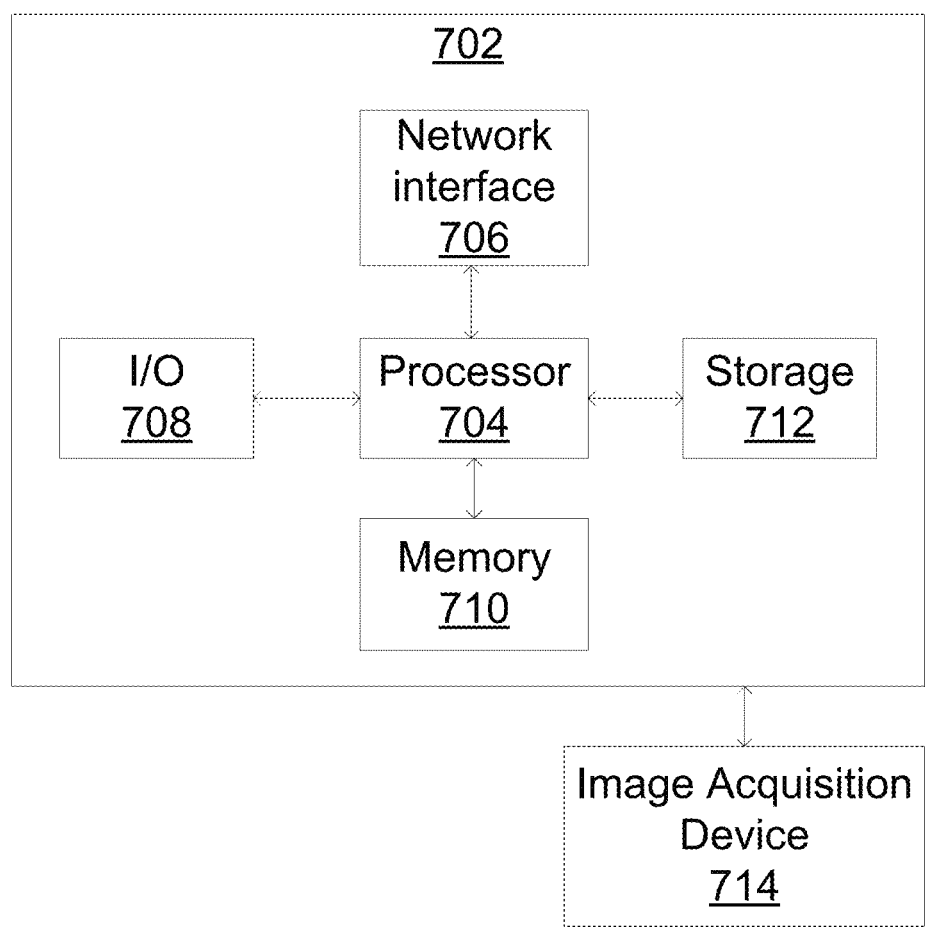
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 or 2 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 704 executes the method and workflow steps or functions of FIG. 1 or 2. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving first and second input medical images of a patient, the first input medical image comprising an annotation of a location of an object of interest;
extracting features from the first and the second input medical images;
determining a location of the object of interest in the second input medical image using a machine learning based location predictor network based on the annotation of the location of the object of interest in the first input medical image and the extracted features from the first and the second input medical images, wherein determining a location of the object of interest in the second input medical image using a machine learning based location predictor network based on the annotation of the location of the object of interest in the first input medical image and the extracted features from the first and the second input medical images comprises:
correlating the features extracted from the first input medical image with the features extracted from the second input medical image, wherein correlating the features extracted from the first input medical image with the features extracted from the second input medical image comprises:
matching features extracted from the first input medical image for regions corresponding to the location of the object of interest with features extracted from the second input medical image, and
determining the location of the object of interest in the second input medical image based on the correlated features; and
outputting the location of the object of interest in the second input medical image,
wherein the machine learning based location predictor network is trained based on a comparison between 1) locations of a particular object in a sequence of training images determined during a forward tracking of the particular object through the sequence of training images and 2) locations of the particular object determined during a backward tracking of the particular object through the sequence of training images.

2. The computer-implemented method of claim 1, wherein the machine learning based location predictor network determines the locations of the particular object from a first image to a last image of the sequence of training images during the forward tracking and the machine learning based location predictor network determines the locations of the particular object from the last image to the first image in the sequence of training images during the backward tracking.

3. The computer-implemented method of claim 1, wherein the machine learning based location predictor network is further trained based on a comparison between locations of the particular object in annotated training images of the sequence of training images and annotated ground truth locations of the particular object in the annotated training images.

4. The computer-implemented method of claim 1, wherein the machine learning based location predictor network is further trained based on a comparison between a location of the particular object in a first training image of the sequence of training images and an annotated ground truth location of the particular object in the first training image of the sequence of training images.

5. The computer-implemented method of claim 1, wherein a first image and a last image in the sequence of training images are annotated with a ground truth location of the particular object.

6. The computer-implemented method of claim 1, wherein the first and the second input medical images are of a sequence of medical images, the method further comprising:
repeating the receiving, the extracting, the determining, and the outputting using the second input medical image as the first input medical image and a next image of the sequence of medical images as the second input medical image.

7. The computer-implemented method of claim 1, wherein the location of the object of interest in the first input medical image is manually annotated by a user or automatically annotated using a machine learning based network.

8. An apparatus comprising:
means for receiving first and second input medical images of a patient, the first input medical image comprising an annotation of a location of an object of interest;
means for extracting features from the first and the second input medical images;
means for determining a location of the object of interest in the second input medical image using a machine learning based location predictor network based on the annotation of the location of the object of interest in the first input medical image and the extracted features from the first and the second input medical images, wherein the means for determining a location of the object of interest in the second input medical image using a machine learning based location predictor network based on the annotation of the location of the object of interest in the first input medical image and the extracted features from the first and the second input medical images comprises:
means for correlating the features extracted from the first input medical image with the features extracted from the second input medical image, wherein the means for correlating the features extracted from the first input medical image with the features extracted from the second input medical image comprises:
means for matching features extracted from the first input medical image for regions corresponding to the location of the object of interest with features extracted from the second input medical image, and
means for determining the location of the object of interest in the second input medical image based on the correlated features; and
means for outputting the location of the object of interest in the second input medical image,
wherein the machine learning based location predictor network is trained based on a comparison between 1) locations of a particular object in a sequence of training images determined during a forward tracking of the particular object through the sequence of training images and 2) locations of the particular object determined during a backward tracking of the particular object through the sequence of training images.

9. The apparatus of claim 8, wherein the machine learning based location predictor network determines the locations of the particular object from a first image to a last image of the sequence of training images during the forward tracking and the machine learning based location predictor network determines the locations of the particular object from the last image to the first image in the sequence of training images during the backward tracking.

10. The apparatus of claim 8, wherein the machine learning based location predictor network is further trained based on a comparison between locations of the particular object in annotated training images of the sequence of training images and annotated ground truth locations of the particular object in the annotated training images.

11. The apparatus of claim 8, wherein the machine learning based location predictor network is further trained based on a comparison between a location of the particular object in a first training image of the sequence of training images and an annotated ground truth location of the particular object in the first training image of the sequence of training images.

12. The apparatus of claim 8, wherein a first image and a last image in the sequence of training images are annotated with a ground truth location of the particular object.

13. A non-transitory computer readable medium storing computer program instructions, the computer program instructions when executed by a processor cause the processor to perform operations comprising:
receiving first and second input medical images of a patient, the first input medical image comprising an annotation of a location of an object of interest;
extracting features from the first and the second input medical images;
determining a location of the object of interest in the second input medical image using a machine learning based location predictor network based on the annotation of the location of the object of interest in the first input medical image and the extracted features from the first and the second input medical images, wherein determining a location of the object of interest in the second input medical image using a machine learning based location predictor network based on the annotation of the location of the object of interest in the first input medical image and the extracted features from the first and the second input medical images comprises:
correlating the features extracted from the first input medical image with the features extracted from the second input medical image, wherein correlating the features extracted from the first input medical image with the features extracted from the second input medical image comprises:
matching features extracted from the first input medical image for regions corresponding to the location of the object of interest with features extracted from the second input medical image, and
determining the location of the object of interest in the second input medical image based on the correlated features; and
outputting the location of the object of interest in the second input medical image,
wherein the machine learning based location predictor network is trained based on a comparison between 1) locations of a particular object in a sequence of training images determined during a forward tracking of the particular object through the sequence of training images and 2) locations of the particular object determined during a backward tracking of the particular object through the sequence of training images.

14. The non-transitory computer readable medium of claim 13, wherein the machine learning based location predictor network determines the locations of the particular object from a first image to a last image of the sequence of training images during the forward tracking and the machine learning based location predictor network determines the locations of the particular object from the last image to the first image in the sequence of training images during the backward tracking.

15. The non-transitory computer readable medium of claim 13, wherein the first and the second input medical images are of a sequence of medical images, the operations further comprising:

repeating the receiving, the extracting, the determining, and the outputting using the second input medical image as the first input medical image and a next image of the sequence of medical images as the second input medical image.

16. The non-transitory computer readable medium of claim 13, wherein the location of the object of interest in the first input medical image is manually annotated by a user or automatically annotated using a machine learning based network.

* * * * *